Nov. 14, 1933.  E. WILDHABER  1,934,754
METHOD AND MEANS FOR FORMING GEARS
Filed March 23, 1931  2 Sheets-Sheet 1
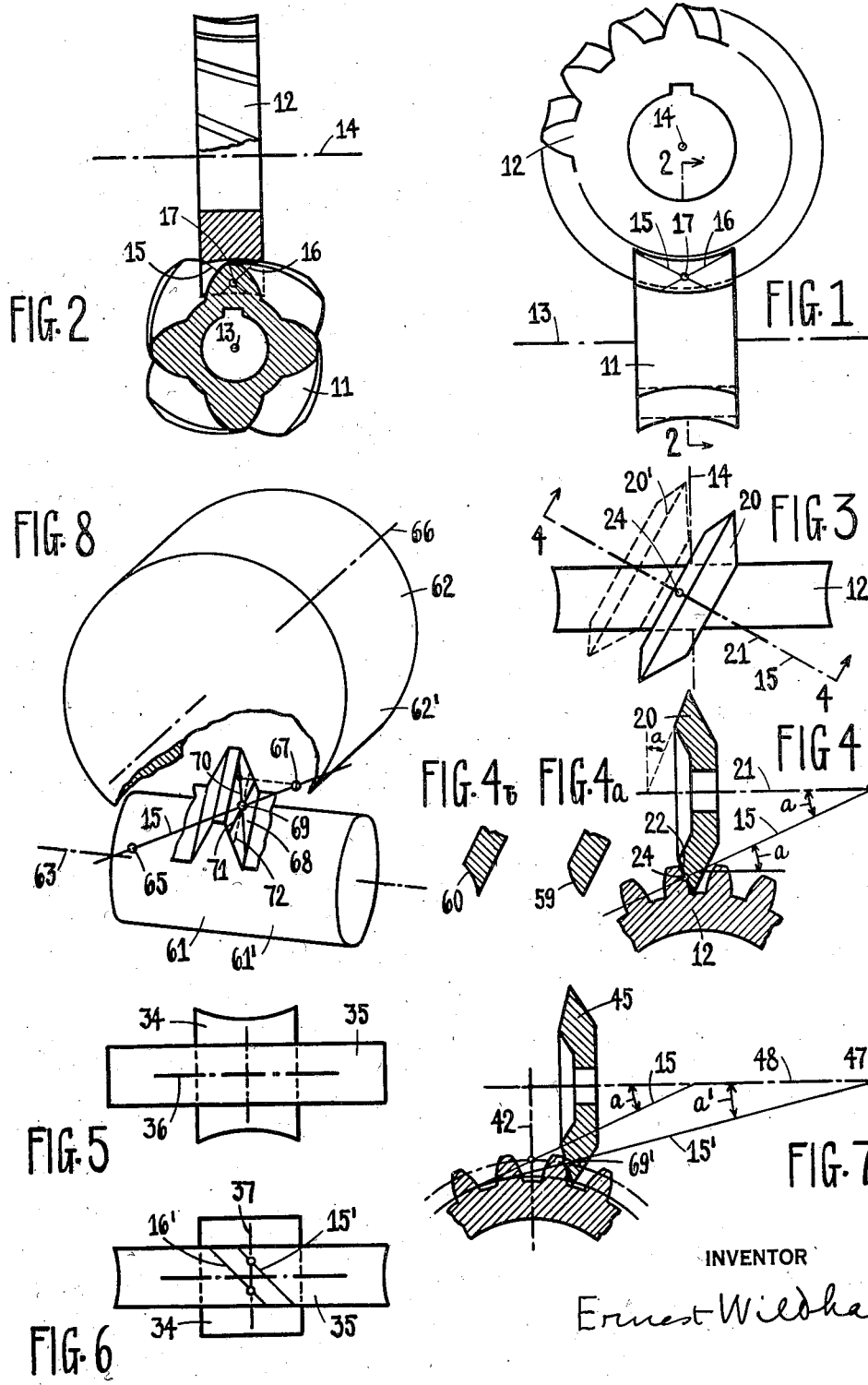
INVENTOR
Ernest Wildhaber Nov. 14, 1933.  E. WILDHABER  1,934,754
METHOD AND MEANS FOR FORMING GEARS
Filed March 23, 1931  2 Sheets-Sheet 2
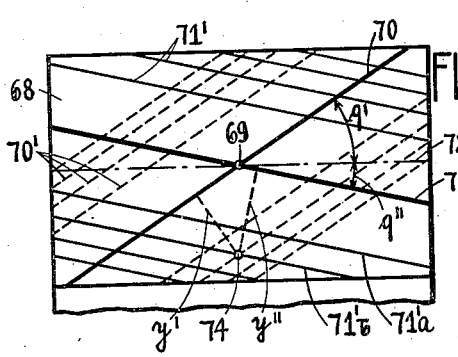
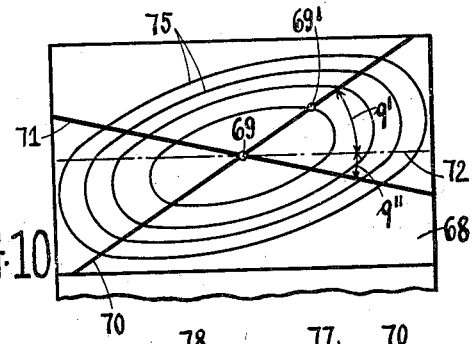
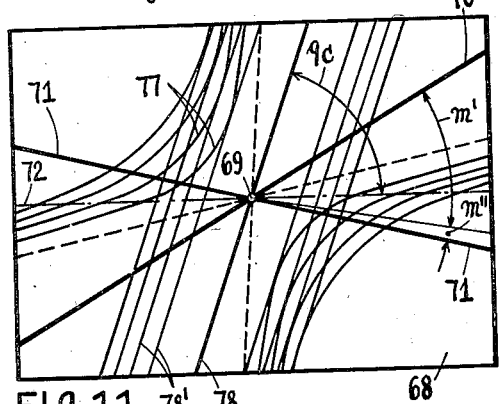
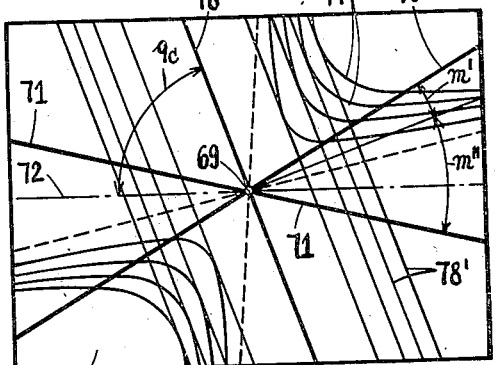
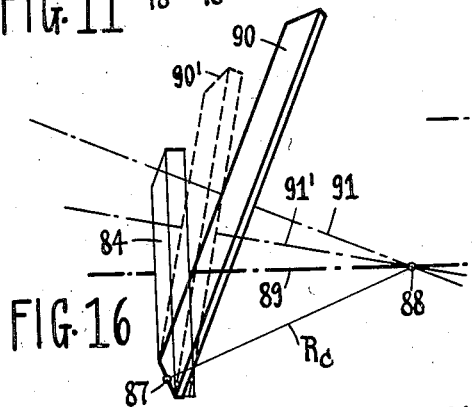
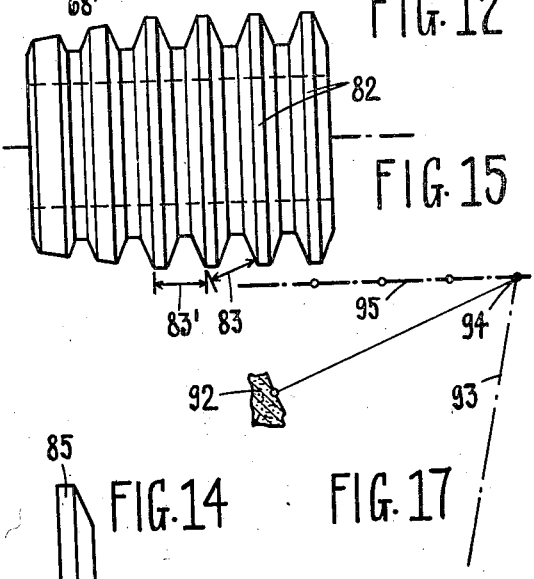
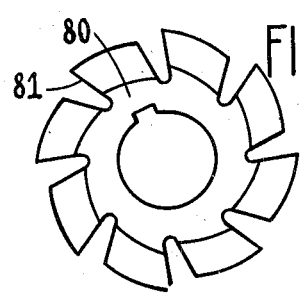
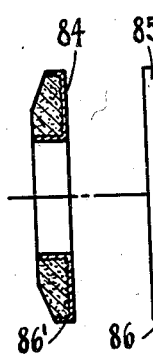
INVENTOR
Ernest Wildhaber Patented Nov. 14, 1933

1,934,754

UNITED STATES PATENT OFFICE 1,934,754

METHOD AND MEANS FOR FORMING GEARS

Ernest Wildhaber, Brooklyn, N. Y.

Application March 23, 1931. Serial No. 524,634

10 Claims. (Cl. 51—278)

The present invention relates to methods of and means for forming gears, and particularly of gears having differing profiles in parallel planes perpendicular to their axes. The present invention is intended especially for use on gears having angularly disposed axes, such as worms and worm gears, bevel gears and hypoid gears, but some of its principles can also be applied to gears with parallel axes.

One object of the present invention is to provide a novel method for accurately and expeditiously forming a pair of gears at least one of which has differing tooth profiles in parallel planes perpendicular to its axis. Another object is to provide a novel method for accurately and efficiently forming gear pairs of novel tooth form, either by cutting or by grinding.

Another aim is to provide a method for accurately and efficiently cutting a novel pair of worm gears, in which the worm contains differing thread profiles in parallel planes perpendicular to its axis, and a method for grinding both members of said pair of worm gears, worm and worm wheel.

Further a method of efficiently cutting or grinding a pair of mating worm gears shall be devised, of which both gears of said pair, frequently called the worm and the wheel, contain differing profiles in parallel planes perpendicular to their respective axes. Another object is to provide suitable means for carrying out the aforesaid method.

The present application is a continuation in part of my application entitled: Method of forming gears, filed May 4, 1928, Serial No. 275,143, which matured in Patent No. 1,797,461 on March 24, 1931.

The present application relates specifically to a method of forming gears with milling cutters or grinding wheels, which was only broadly claimed in the aforesaid patent, and it further relates to the novel tooth shape of worm gears and other gears which may be produced thereby and with the method specifically claimed in said patent.

A further object is to provide a pair of worm gears, which are conjugate to basic members whose tooth surfaces or thread surfaces have diverging longitudinal profiles and which have a pressure angle differing from the pressure angle of said pair of worm gears.

A number of other objects will appear in the course of the specification and from recital of the appended claims.

My invention will be explained by way of examples illustrated in the accompanying drawings, in which:

Fig. 1 is a diagrammatic view of a pair of worm gears such as may be formed in accordance with the present invention, the view being taken in the direction of the axis of the larger member of the pair, frequently called worm wheel.

Fig. 2 is a view and partly a section along lines 2—2 of Fig. 1.

Fig. 3 is a view of a worm gear in engagement with a forming member, illustrative of one embodiment of the present invention.

Fig. 4 is a partial normal section through the teeth or threads of the worm gear shown in Fig. 3, along lines 4—4 of Fig. 3, and an axial section of the forming member shown in Fig. 3. For convenience, the tooth section is shown longer than corresponds to the width of face of gear 12.

Fig. 4a and Fig. 4b are auxiliary views illustrative of forming members having modified surfaces.

Fig. 5 and Fig. 6 are diagrammatic plan views of pairs of worm gears, in which only one gear of the pair contains differing profiles in parallel planes perpendicular to its axis. Fig. 6 is furthermore a view explanatory of a certain manner of computation hereafter referred to.

Fig. 7 is a normal section through the threads of a large worm having differing profiles in parallel planes perpendicular to its axis, and an axial section through a forming member. Fig. 7 can also be considered as a normal section through a worm wheel. Fig. 7 illustrates in either case the use of a different pressure angle for generating as compared with the pressure angle of the finished pair of gears.

Fig. 8 is a perspective diagram illustrative of a mean line of action between a pair of worm gears, and of certain relations between the mesh of said worm gears and a plane perpendicular to said line of action, adjacent a mean point of mesh.

Fig. 9, Fig. 10, Fig. 11 and Fig. 12 are diagrams explanatory of certain interrelations observed in establishing the proportions and setting of a forming member in accordance with the present invention. The said diagrams are in the nature of topographic maps of the tooth surfaces adjacent a mean point of the line of action.

Fig. 13 is an end view of a milling cutter, such as may be used in accordance with the present invention for cutting worms having differing profiles in parallel planes perpendicular to the worm axis, also for cutting worm wheels, and broadly for cutting worm gears, which term is used to denote worms and worm wheels.

Fig. 14 is a front view, partly an axial section of a pair of grinding wheels, such as may be used for grinding opposite tooth sides of different tooth spaces of a worm gear having differing profiles in parallel planes perpendicular to its axis.

Fig. 15 is a diagrammatic front view of a cutter unit such as may be used for cutting worm gears of the character referred to.

Fig. 16 is a diagram illustrative of a modification of the present invention, and showing grinding wheels of different size, which are so positioned as to be practically equivalent in their action.

Fig. 17 is a diagram illustrative of a further modification, in which a cutting surface or grinding surface of spherical form is used.

In the Figures 1 and 2 the numerals 11 and 12 denote a pair of worm gears of comparatively small ratio, rotatable on axes 13, 14 which are angularly disposed to each other, namely disposed at right angles in the illustrated instance. Gearing of this character has hitherto often been embodied by a pair of gears having helical teeth or threads of constant profile, both gears being conjugate to the same rack. The gears then could be cut like ordinary helical gears with standard tools, and present no difficulty or additional expense.

When both gears (11 and 12) are provided with helical teeth, they are, however, not fully conjugate to each other, as is known. They are suited to transmit uniform motion, but contact with each other only in a point or in point at a time, whereas fully conjugate gears contact with each other along lines.

I shall now proceed to describe a novel method, with which the gears 11 and 12, may be formed to mesh either with line contact or with any desirable approximation of line contact, and which permits the use of standard tools, which is very efficient, and which can be carried out on simple and rigid machines of known general character. When the gears 11 and 12 are provided both with helical teeth with a known method, they mesh with point contact, as already mentioned, and a point of contact moves during the mesh along a line of action 15 or 16. These lines are straight and perpendicular to the tooth surfaces when the gears 11 and 12 are provided with involute tooth forms, that is to say with the tooth forms now in general use. The involute form of teeth, as well known, may be derived from a basic rack which contains plane tooth sides, and may be produced in conventional manner with hobs having substantially straight cutting edges.

Ordinarily the two lines of action 15, 16 intersect in a point (17), which is frequently called the pitch point and in which the axial pitch of gear 11 equals the circular pitch of gear 12.

Instead of forming both gears 11 and 12 conjugate to a rack and thereby obtaining point contact between the two gears, I form at least one of the gears conjugate to a surface which may mesh with said gear also along a line of action 15, or 16, but which is convex in a direction lengthwise of the teeth. According to one embodiment of the invention, a milling cutter or grinding wheel 20 is provided, see Fig. 3 and Fig. 4, and set so that its axis 21 intersects the normal or line of action 15, and in the view Fig. 3 coincides with the projected normal 15. Forming member 20 contains a straight profile 22 in an axial section, see Fig. 4, and its forming surface is a conical surface. When the surface is moved in the direction of its axis 21, it remains perpendicular to line 15 as are also the contacting tooth surfaces of the gears 11 and 12 immediately adjacent a point of contact along line 15. Forming member 20 can be considered to represent a tooth side of a basic member, which in the illustrated instance contains conical tooth surfaces.

The mesh between the two gears 11 and 12 along line 15 takes place at a uniform rate, that is to say a point of contact moves along the line of action 15 exactly in proportion to the turning angles of the gears, and it moves a distance, which will be called perpendicular pitch, per motion of the gears by one tooth. Forming member 20 can therefore be made to mesh along line 15 with a gear blank, when it is moved along its axis 21 at such a uniform rate, that its intersection point with line 15 also moves one perpendicular pitch per angular motion of the gear blank by one tooth. In the position of the forming member shown in full lines, it contacts at a point 24 of line 15 with gear blank 12. A further position of the forming member 20 in its path along its axis 21 is indicated in dotted lines 20' in Fig. 3.

The conical surface of the forming member 20 naturally removes less stock from the blank, than a surface embodying the plane side of a rack tooth. The amount of stock left on the sides of line 15 depends on the diameter of the conical forming wheel, a wheel of larger diameter removing more stock than a wheel of smaller diameter. The conical surface of a forming wheel of very large diameter would practically be identical with a plane tooth side of a rack, in the zone of mesh, and therefore remove too much stock on the sides, effecting point contact between mating gears. By suitably selecting the diameter of the forming wheel, stock may be removed in such a measure that line contact between the mating gears results, or a contact which approximates line contact and yet allows slight misalignment.

A novel and practical method for computing the size of the forming wheel will be described hereafter. It forms an important part of the present invention, inasmuch as the complete success of the method depends largely on the proper selection of a forming wheel, and inasmuch no such or similar manner of computation existed, as far as I am aware, either in this or in other fields.

The degree of divergence of the conical surface of the forming member from the plane side of a rack depends not only on the diameter of the forming wheel, but also on the inclination angle $a$ of its profile 22 with respect to a plane perpendicular to its axis. The degree of divergence, and with it the degree of removing stock outside of line 15, can be measured with the radius of curvature of the forming surface in a plane containing normal 15 and extending in the direction of the circumference, that is to say in longitudinal direction. In other words the degree of divergence can be measured with the radius of curvature of the forming surface in a plane perpendicular to the plane of the drawing Fig. 4 and containing line 15. It can be demonstrated with the known means of mathematics, that this radius of curvature equals distance 24—25, point 25 being the intersection point between normal 15 and axis 21, and being the center of said curvature. It is this quantity 24—25 which will be especially computed hereafter, and which will be denoted with the symbol $R_c$.

The present invention can be practised for forming gear pairs as indicated in the Figures 5 and 6 as well as for forming gear pairs according to Fig. 1 and Fig. 2. According to Fig. 5 the worm 34 or smaller gear of a pair of worm gears 34, 35 contains differing profiles in parallel planes perpendicular to its axis 36, while the gear 35 is provided with helical teeth of constant profile. Gear 35 may therefore be produced according to any suitable known method, while only worm 34 is formed with a method according to the present invention. According to Fig. 6 the worm 34 contains helical threads, and may be formed in any suitable known manner, and only the worm gear 35 contains differing profiles in parallel planes perpendicular to its axis 37. In this case gear 35 has the character of a known worm wheel.

Fig. 6 also illustrates a somewhat modified form of mesh, inasmuch as the lines of action 15', 16' do not intersect, but are offset from one another. Intersection is not a necessity, between the two lines of action (15, 16) which form the basis of computation and settings in accordance with the present invention. The only requirement for the two lines of action 15', 16' is a position such that a force acting in the direction of a line of action (15' or 16') exerts turning moments on the two gears of a pair in proportion to the respective numbers of teeth or threads.

In the case illustrated in Fig. 3 and Fig. 4, the gear blank is periodically indexed, namely after finishing one or both sides of a tooth space. Feed between forming member 20 and gear blank 12 is in the direction of axis 21, at an angle to the direction of the axis 14 of the gear blank.

Fig. 7 illustrates a refinement of my invention as so far described:

The basic member has concentric conical tooth surfaces, whose pressure angle $a'$ differs from the pressure angle $a$ of the gear. The pressure angle of a forming wheel 45, whose axis 48 is concentric with the axis of said basic member, is equal to the pressure angle $a'$ of said basic member and therefore also differs from pressure angle $a$. The latter is understood to be measured at the intersection point (17, Fig. 1 and Fig. 2) of the surface of action with the shortest connection line (17—13, Fig. 1) between the axes of said gear pair. This point usually coincides with the contact point of the pitch surfaces of the pair of worm gears.

Provision of a pressure angle $a'$ differing from pressure angle $a$ has various advantages. It effects the diameter of the forming member, and therefore permits the use of forming members of suitable diameters. On small size gears it is usually desired to use a forming member of larger diameter than would result when the pressure angle $a'$ is equal to pressure angle $a$. On large gears it is often desired to use a forming member of smaller diameter than would result when $a'$ is equal to $a$. Furthermore such provision also permits to cut or grind any job with forming members of given standard diameters, and to cut worm gears of any character with a restricted number of standard cutters.

Last but not least, I have found that a still closer approximation of any desired tooth shape of a gear blank may be obtained, when pressure angle $a'$ of the basic member differs from the pressure angle $a$. This feature is appreciated especially when the tooth action extends over a very large area.

In all such cases a gear blank 11 is made to mesh with a forming member 45 along a line of action 15' which has a different inclination or pressure angle $a'$ than the line of action 15, along which the completed gear pair meshes. And the inclination or pressure angle $a'$ of the forming member (45) is different from the pressure angle $a$ of line of action 15 that is to say from the angle $a$ at which line 15 is inclined to a plane parallel to the two axes of the pair of gears.

In the instance illustrated in Fig. 7, the pressure angle $a'$ is smaller than the pressure angle $a$ of the finished gear pair; and the curvature radius $R_c$ of the forming tool is larger than would be obtained by a forming tool of equal diameter and a pressure angle $a$ equal to the pressure angle of the gear blank.

A line of action 15' may be obtained by turning the known line of action 15 about the axis of the gear blank, and its position can be determined with the known methods of mathematics. In the preferred embodiment illustrated, line 15' is a straight line, as is also line 15. The conical forming surface of milling cutter or grinding wheel 45 is perpendicular to line 15'. In operation, wheel 45 is so moved, that the intersection point of said conical surface with straight line 15' is displaced one perpendicular pitch per turning motion of the gear blank by one tooth, as already described. Even after the position of line 15' has been determined, the direction of axis 48 of the basic member and of wheel 45 may still be chosen to a limited extent. Often the said direction is so chosen, that axis 48 intersects radius 42, which passes through the pitch point (17, Fig. 1), and forms a connection between said radius and normal 15'.

The computation of the diameter of wheel 45, and particularly of the normal radius $R_c$, which is equal to distance 47—69, may be made along the general lines indicated hereafter.

When it is desired to form a predetermined tooth shape with a highest degree of approximation, the computation is carried out of various pressure angles $a'$, and thereafter the best form of tooth is selected through actual test or through further computation.

The present invention is not confined to gearing with straight lines of action 15, but is generally applicable to all kinds of gearing. In all cases of worm gear pairs, one may base the computation on the line of action which exists between a pair of gears having helical teeth. This line of action is a straight line 15 when such helical teeth contain involute helical tooth sides. Other tooth forms generally furnish a curved line of action, which can be determined with the known means of the art. In the general or broad case the forming members may be provided with curved profiles, as indicated at 59 and 60 in the Figures 4a and 4b.

Computation will now be explained, referring first to Fig. 8. In this figure, 61 and 62 denote a pair of worm gears, indicated in a very diagrammatic manner by their general shape. Line of action 15 is in the assumed instance a straight line, which comes closest to axis 63 of worn gear 61 in a point 65; and which comes closest to axis 66 of worm gear 62 in a point 67.

If the teeth or threads of both gears 61, 62 were helical, and provided with involute helical tooth surfaces, then line of action 15 would be the sole line of action on one side of the teeth. The tooth surfaces would be conjugate to the plane sides of a rack. One side 68 of such a rack is shown in a mean position, in which it intersects line of action 15 in a point 69. This point is frequently made also the contact point between auxiliary pitch surfaces (61', 62') of cylindrical shape, and is here so assumed. Let $r'$ and $r''$ be the distances of point 69 from the axes 63 and 66, or the radii of the said auxiliary pitch surfaces 61', 62'. Let again $a$ denote the pressure angle of line of action 15, that is to say the angle included between line 15 and a plane parallel to the axes 63 and 66; and let $h$ be the angle between the direction of the rack teeth and a plane perpendicular to axis 63. When point 69 is the contact point between said auxiliary pitch surfaces, then angle $h$ can also be considered as the lead angle of worm gear 61 at the radius $r'$.

We will first consider the mesh between imagined involute helical tooth surfaces. Such surfaces mesh with point contact as known. It will then be shown, how the degree of said point contact or its deviation from line contact may be computed, in accordance with the present invention, and how its deficiency can be remedied. As already pointed out a remdy is effected by forming at least one of the gears so that it contains non helical teeth, that is to say differing tooth profiles or thread profiles in parallel planes at right angles to its axis.

In considering the mesh of the imagined involute helical tooth surfaces, such surfaces of worm gear 61 mesh with plane 68 in a manner to contact with it along a straight line 70, which is parallel to the projection of axis 63 into plane 68, as is known to those familiar with gear mathematics. Moreover the imagined involute helical teeth of worm gear 62 mesh with plane 68 in a manner to contact with it along a straight line 71, which is parallel to the projection of axis 66 to plane 68. The pitch line of the rack is indicated as a dash and dot line 72 which is the intersection of the pitch plane of the rack with the plane of tooth sides 68. The said pitch plane, as shown, is parallel to the two axes 63, 66.

The nature of the helical tooth surfaces will now be further analyzed adjacent their point of contact 69. Fig. 9 shows the plane side 68 of the rack laid down in the plane of the drawing. The imagined helical tooth surfaces of the gears 61, 62 contact with the plane (68) of the drawing along the aforesaid lines 70, 71. With a high degree of approximation, the helical tooth surfaces themselves can be considered as conical surfaces, of which lines 70 and 71 are generatrices, and which at point 69 have curvature radii C, in a normal section perpendicular to lines 70, 71 respectively. A curvature radius C is known to be equal to the actual length of distance 69—65 and of distance 69—67 respectively, see Fig. 8, that is to say to the distances 69—65 and 69—67 measured on the actual tooth normal 15.

Instead of substituting a conical surface in place of an involute helical surface, a cylindrical surface of the same curvature radius C may be substituted, with the same close degree of approximation, when only parts immediately adjacent point 69 are considered. A surface of this character is known as a curvature surface in mathematics. In Fig. 9 the lines 71' drawn parallel to contact line 71 are generatrices of one of said cylindrical curvature surfaces, having each a constant distance from the plane (68) of the drawing along their whole length. The various indicated lines 71' correspond to distances which increase in the manner of an arithmetic progression, namely as 1, 2, 3, 4. The lines 71' form a topographical map of the considered tooth surface adjacent point 69, by constituting lines of equal altitude or elevation from the plane of the drawings. The lines 71'a correspond to a certain altitude from the plane of the drawings; the lines 71'b correspond to double said altitude and so on.

In a similar way, lines 70' drawn parallel to line of contact 70 are lines of equal altitude or elevation, and form a topographical map of the other considered tooth surface, which contacts with the plane (68) of the drawing along line 70. Lines 70' correspond to distances on the opposite side of plane 68 as compared with the distances of line 71'. In other words the tooth surfaces contact with the plane of the drawing (68) from opposite sides. For this reason lines 70' are shown dotted.

In the considered area, the distance of any point of a tooth surface or of its cylindrical curvature surface is proportional to the square of its direct distance $y$ from the line of contact 70 or 71. The distance ($z$) of any such point from the plane of the drawings equals $$\frac{y'^2}{2C'} \text{ or } \frac{y''^2}{2C''},$$

when $y'$ and $y''$ denote the direct or normal distance of a considered point from the lines 70 and 71 respectively, and when $C'$ and $C''$ denote the respective radii of curvature. This relation is well known in mathematics: it is the distance of a point of a circle or parabola from its tangent.

Considering any point, such as point 74, it will have a distance $z'$ from the plane of the drawings, when point 74 is a point of the tooth surface extending along line 70. And it will have a distance $z''$ from the plane of the drawings, when point 74 is a point of the tooth surface extending along line 71. The distance between the tooth surfaces themselves, at point 74, equals the sum of the individual distances $z'$ and $z''$, or $$\left(\frac{y'^2}{2C'} + \frac{y''^2}{2C''}\right).$$

This total distance is zero only in point 69.

Lines of constant total distance $z=(z'+z'')$ between the tooth surfaces can be determined with the above interrelation. Such lines 75 are shown in Fig. 10, in which the drawing plane is also identical with the plane side 68 of the rack. The lines 75 are lines of equal elevation or altitude of one tooth surface from the other, adjacent point of contact 69, and are found to be ellipses. Fig. 10 thereby illustrates the nature of the point contact of gears, when each gear is provided with helical teeth.

During mesh the point of contact 69 moves on the tooth surface of each gear. The point of contact is always the intersection point between the line of action 15 and a considered tooth surface. Considering for instance the tooth surface of gear 62, the path of the point of contact on said tooth surface can be readily determined with known means, and the direction of said path adjacent point 69 is found to be identical with line 70, provided that the axes 63 and 66 are disposed at right angles to each other, as is usual. Line 70 has then two characteristics: It is the contact line between the plane rack side 68 and the tooth surface of gear 61, and it is the path of the point 69 of contact on the tooth surface of gear 62. A further position of the point of contact is indicated at 69' in Fig. 10.

Instead of the point contact illustrated in Fig. 10 for both gears having helical teeth, contact along a line or almost along a line is desired. Stock should be left on gear 62 in such manner that tooth contact along path 70 remains untouched, that is to say the gear action along line of action 15 should be maintained intact. The said action along line 70 is not affected when modifying the tooth surface in such a manner that additional stock is left in correspondence to the ordinates (z) of any cylindrical surface, which contacts with the plane 68 along line 70. Material added along lines parallel to line 70 but not on line 70 itself, will not affect the gradual contact along line 70, at least when kept inside of the limits hereafter determined.

When stock is left in such manner, the helical nature of the just considered tooth surface ends. The ordinates $z$ of the tooth surface, referring to the plane 68 of the drawings, are then composed of the ordinates $z''$ of the convex involute helical tooth surface contacting with plane 68 along line 71, and of the ordinates of the added cylindrical surface, whose generatrices are parallel to line 70 and which can be considered as contacting along line 70 with the plane 68 of the drawings.

Stock may be left in the above said manner up to a degree, when contact between the mating surfaces is to be confined to a point (69) and extends along a line, which in the considered moment passes through point 69. The said degree is attained, when stock is left in correspondence with the ordinates $z'$ of the above said cylindrical surface having a radius of curvature $C'$ and contacting with the plane 68 along line 70. Contact between mating tooth surfaces then takes place along line 71. The ordinates $z$ of the ellipsoid shown in Fig. 10, illustrative of the divergence of the mating tooth surfaces adjacent point 69, are namely composed of the ordinates $z'$ and $z''$ of the two aforesaid individual cylindrical surfaces; and when the ordinates $z'$ are subtracted, only the ordinates $z''$ remain. These latter are zero along line 71, which is therefore the line of contact.

Frequently it is desirable to effect a contact which only approximates line contact, but not quite reaches it. Such contact is known to be less sensitive to misalignment and inaccuracies, than would be a rigid line contact, while at the same time approaching the load capacity of line contact. In this case the stock left corresponds to a cylindrical surface of equal direction, but having a radius of curvature somewhat larger than $C'$.

The tooth surface adjacent point 69 of worm gear 62, is in any case a surface, whose ordinates $z$ are composed of the ordinates $z''$ and ordinates equal to or a constant fraction of ordinates $z'$, depending on whether full line contact or approximate line contact is desired.

For convenience, the latter ordinates will be introduced under the symbol $z'$ in either case, whether they are exactly equal or only approximately equal to the ordinates $z'$ previously referred to.

The ordinates $z$ of the desired tooth surface of worm gear 62 (which corresponds to $C''$) are determined as follows: $z=z'-z''$, that is to say as the difference of the ordinates $z'$ and $z''$, inasmuch as the ordinates $z'$ are added in a direction opposite to the ordinates $z''$. Fig. 11 shows a topographical map of the desired tooth surface adjacent point 69. The lines 77 of equal elevation $z=(z'-z'')$ are found to be hyperbolas. They have been drawn in the manner heretofore described, and the different curves have elevations $z$ corresponding to an arithmetic progression.

The conical forming surface of a milling cutter or grinding wheel contacts with plane 68 along a straight line 78 which is parallel to the (normal) projection of the axis of said wheel unto plane 68, and whose location can be determined with the known methods of mathematics. Line 78 includes an angle $q_c$ with the peripheral direction 72 at pitch point 69. When the pressure angles $a$ and $a'$ are alike, angle $q_c$ is 90°, as readily evident from consideration of Fig. 3 and Fig. 4. Angle $q_c$ differs from 90° only when pressure angle $a'$ differs from pressure angle $a$.

Like the imagined involute tooth surfaces of the gears, the conical surface can be substituted adjacent point 69 by a cylindrical surface which contacts with plane 68 along line 78. The said cylindrical surface is now so selected in accordance with the present invention, that it fits into the desired tooth surface, in a manner, that the straight generatrices 78' of said cylindrical surface are tangent to the corresponding hyperbolas 77. The contacting straight generatrices and hyperbolas have the same elevation from the plane of the drawings, as is quite evident. The radius of curvature $R_c$ of the cylindrical surface, in a plane perpendicular to line 78, can now be determined in principle with known means. A practical way of determining radius $R_c$ is indicated hereafter. The diameter of the cutter or grinding wheel may then be computed in the manner previously explained.

I have fully reproduced the steps taken in the analysis for determining hobs or forming members, to enable those skilled in the art not only to apply my invention, but also to understand it. The actual computation is short and accurate. It does not require drawings or diagrams, but can be carried out with a small number of simple formulas, which may be derived from the steps of the disclosed analysis. For the convenience of those who want to apply my invention, a complete set of such formulas is reproduced hereafter.

I have derived the following simple formula for determining the curvature radius $R_c$ (for forming the gear $C''$), from the given curvature radii $C'$ and $C''$, and given angles $m'$ and $m''$ included between a line perpendicular to line 78 and lines 70, 71, see Fig. 11. It can be checked with known means of mathematics.

$$R_c = \frac{C' \cdot \cos^2 m'' - C'' \cdot \cos^2 m'}{\sin^2 (m'+m'')}$$

Herein $(m'+m'')$ is the angle included between the lines 70 and 71.

Fig. 12 is a diagram illustrative of forming gear 61 in accordance with the present invention. The principles applied are the same as explained with reference to Fig. 11. When only one gear of a pair of worm gears is formed in accordance with my invention, I usually prefer to do this on the smaller gear of the pair, that is to say on the worm, while cutting the larger gear in any suitable known way, so that its tooth sides are portions of helical surfaces.

Preferably both gears of a pair of worm gears are formed in accordance with the present invention. A novel form of tooth is thereby obtained, which is found to have a large load capacity and which is highly efficient.

When both gears of a pair of worm gears are formed in accordance with my novel method, stock is left on both gears of the pair in a manner that its tooth surfaces or thread surfaces protrude over helical surfaces. Intermediate radii $R_c'$ and $R_c''$ may be computed in the manner described with reference to curvature radius $R_c$. Radius $R_c'$ then constitutes the curvature radius of the tool surface in the imaginary case, when the mating gear contains helical teeth; and radius $R_c''$ constitutes the curvature radius of the tool surface for producing the other worm gear of the pair, in the imaginary case, when the first said gear contains helical teeth. The stock left on the teeth of the two worm gears is then divided up in any suitable proportion, adapted to the particular combination.

I have found it also possible, on worm gears having axes disposed at right angles to each other, to form one gear with a forming member corresponding to a curvature radius $R_c'$, and to form the other gear not as a helical gear, but also as a gear having a concave lengthwise tooth curvature. Its forming member should then correspond to a curvature radius which is in no case smaller than $R_c'$ and which is usually larger than $R_c''$.

Preferably at least one of a pair of worm gears is formed conjugate to a forming member characterized by a curvature radius $R_c'$ determined as aforesaid.

A worm gear pair produced in accordance with the present invention may be characterized as conjugate to basic members having diverging longitudinal profiles. Moreover the tooth sides of two worm gears of a pair are conjugate to surfaces of revolution of basic members of the aforesaid character. Preferably the surfaces of revolution, which correspond to different teeth of said basic members, are disposed coaxially and moreover they are preferably conical surfaces.

In an important embodiment the basic members are such as to mesh at a different pressure angle with a gear, as compared with the pressure angle at which said gear meshes with its mating gear. This statement applies not only to worm gears, but also to other gears, especially spiral bevel and hypoid gears.

My invention is not confined to gears disposed at right angles to each other, or to specific forms of teeth, and it is clearly understood that my invention is also applicable to tapered gears.

The following symbols are used in the formulas below, which may be followed in carrying out my invention; as applied to worm gears:

$r'$ and $r''$ = radii of the cylindrical (auxiliary) pitch surfaces.

$R_x$ = pitch radius of forming member.

$C'$ and $C''$ = radii of curvature at the pitch point (69) of imagined involute helical tooth surfaces of the pair of worm gears.

$R_c$ = radius of curvature of the surface of the forming member, at the pitch point (69 or 69′).

$a$ = pressure angle of the mean line of action (15) of the pair of worm gears.

$a'$ = pressure angle of the basic member; $a'$ may be equal to $a$, or it may differ from $a$.

$h$ = lead angle at the pitch point (69) of the worm gear corresponding to $C'$.

$q'$, $q''$ = angles included between the pitch line (72) and the projections (70, 71) of the respective axes (63, 66) to the tangential plane (68) at the pitch point (69).

$q_c$ = angle included between the pitch line (72) and the projection (78) of the axis of the forming member to said plane (68).

$m'$, $m''$ = angles between perpendicular to line 78 and lines 70, 71 respectively.

The pair of gears are assumed at first, as if they were both provided with helical teeth, and particularly with involute helical teeth.

The formulas may be used in the following sequence:

1. $C' = r' \dfrac{\sin a}{1 - \cos^2 a \cdot \cos^2 h}$; $C'' = r'' \dfrac{\sin a}{1 - \cos^2 a \cdot \sin^2 h}$.

2. $\tan q' = \dfrac{\sin a}{\tan h}$; $\tan q'' = \sin a \cdot \tan h$

3. $q_c = 90°$, when $a = a'$.

When $a$ differs from $a'$, angle $q_c$ is determined in known manner in several steps.

The curvature radius $R_c'$ of a milling cutter or grinding wheel for forming worm gear $C'$ may be determined as follows, supposing that the mating worm gear $C''$ contains involute helical tooth surfaces:

4′. $m' = q' - (90° - q_c)$; $m'' = q'' + (90° - q_c)$.

(For $a' = a$: $m' = q'$; $m'' = q''$)

5′. $R_c' = \dfrac{C'' \cdot \cos^2 m' - C' \cdot \cos^2 m''}{\sin^2(q' + q'')}$ Likewise the curvature radius $R_c''$ of a forming member may be determined as follows, supposing that the mating worm gear $C'$ contains involute helical tooth surfaces:

4″. $m'' = q'' - (90° - q_c)$; $m' = q' + (90° - q_c)$.

(For $a' = a$: $m' = q'$; $m'' = q''$).

5″. $R_c'' = \dfrac{C' \cdot \cos^2 m'' - C'' \cdot \cos^2 m'}{\sin^2(q' + q'')}$.

When both worm gears of a pair are to be cut according to the present method, and both gears are provided with tooth surfaces protruding over helical surfaces, then the curvature radii $R_c'$ and $R_c''$ may be split up in the manner previously described. Otherwise the above values serve directly for determining the radius of the forming member, which is used to cut the worm gear having such protruding tooth surfaces, that is to say whose profiles in an axial plane have a changing inclination with respect to the axis.

6. $R_x = R_c \cdot \sin a'$;

wherein either $R_c'$ or $R_c''$ is to be introduced in place of $R_c$, depending on whether worm gear $C'$ or worm gear $C''$ is cut in the manner described, with the tool in question.

The computations made for one side of the teeth hold good for the other side too.

Preferably the radius of the forming member is made somewhat larger than computed in the above said manner, to obtain a slight modification from line contact.

For further information, especially regarding the tooth form of gears produced with hobs and helical forming members, reference is had to the aforesaid Patent No. 1,797,461.

The simplicity of the cutting tool or grinding tool is apparent from consideration of Fig. 13 and of Fig. 14. A milling cutter 80 contains cutting edges 81 disposed in a surface of revolution, preferably in a conical surface. Usually a milling cutter is provided with at least two sets of cutting edges, which are arranged in coaxial conical surfaces, for cutting opposite tooth sides of a tooth space. Several disk cutters may be added together, so that the cutting edges of the resulting cutter unit occupy a plurality of rings, as diagrammatically indicated in Fig. 15. The rings 82, in which the cutting edges are located, may be made part of the same body, and constitute a circular hob. In operation, the cutter unit or hob is fed in the direction of its axis, in the same manner as an individual conical forming member would be fed. Nonhelical worms, and in principle also worm gears, may be cut in one continuous process with cutter units of the character indicated in Fig. 15.

As many or more full size rings 82 are provided, than there are teeth to be cut in the blank. The feed is then continued in the same direction, until all the teeth are cut, the cutting edges of each ring forming both sides of a tooth space, and successive rings forming successive tooth spaces of the gear blank.

The normal distance 83 of adjacent equal conical surfaces is made equal to the aforesaid perpendicular pitch of the gears, as is readily understood; and the resulting axial pitch 83' of rings 82 is usually smaller than the axial pitch of the worm gears produced therewith. The side inclination of rings 82 is selected as described for an individual wheel with reference to Fig. 4 and also with reference to Fig. 7.

When grinding wheels are used for finishing the teeth, preferably two grinding wheels 84, 85 are provided, which operate in different tooth spaces. Wheel 84 grinds on one side of the teeth, and wheel 85 grinds the other side of the teeth. Inasmuch as the tooth surfaces produced depend on the diameter of the grinding wheels, the grinding wheels are kept at a constant diameter, in grinding a batch of equal gears, and they are trued in a manner that the width 86 of the outside surface is reduced, but not its diameter. In the embodiment referred to in Fig. 14 the axis of the grinding wheels is kept at the same distance from and at the same inclination to the axis of the blank, even after repeated truing.

Through such truing, the grinding wheels become thinner. To maintain a sufficient strength of the grinding wheels, a metal reinforcement 86' is provided. It is of ring form and has preferably a U-shaped section, as indicated. Its inside surface may be corrugated, to obtain good adhesion between said metal and the abrading material. It is understood that the outside end of said metal protection is gradually trued off with the abrading material.

A different way of maintaining the same tooth shape on the gears produced, is illustrated in Fig. 16, where 84 denotes a grinding wheel of the character already described. It has previously been pointed out that the conical grinding surface of wheel 84 can be characterized by the normal radius Rc, which is the distance of mean point 87 of the conical surface from the point 88. The latter is the intersection of the normal at point 87 with the axis 89 of the grinding wheel.

Similarly other grinding wheels, such as wheel 90 may produce substantially the same tooth surfaces as wheel 84, when it contains the same normal radius Rc, that is to say when its axis 91 passes through point 88. It is understood that grinding wheel 90 is moved in the direction of axis 89, and not in the direction of its own axis, to produce substantially the same tooth surfaces as grinding wheel 84.

Grinding wheel 90 may be trued in accordance with conventional practice, whereby its diameter becomes smaller. At one time it will then have a size as illustrated through doted lines 90'. Even then the same tooth surfaces may be produced as in its initial state 90, when also its angular setting is changed, namely so that axis 91' of grinding wheel 90' passes through the aforesaid point 88, while the truing line is maintained in a consant position.

This method of changing the angular setting of a grinding wheel in accordance with its diameter is also applicable with advantage to grinding helical threads or teeth.

Diagram Fig. 17 relates to a case, where the forming surface is a portion of a spherical surface, instead of a conical surface. Numeral 92 denotes a portion of a grinding member having a concave spherical grinding surface. Axis 93 of the grinding member passes through the center 94 of said spherical surface. Spherical surfaces may be contemplated especially in the case of hypoid gears, where one side of the teeth may be formed with a concave spherical surface and the other side with a convex spherical surface. The generating motions are the same as already described. A forming member (92) is rotated on its axis in engagement with a gear blank to effect cutting or abrasion, and a translatory motion is provided along a straight line (95) while at the same time the gear blank is turned on its axis in direct proportion with said translatory motion.

Numerous modifications and changes may be made in my invention without departing from its spirit. So I may provide such departures from fully conjugate tooth forms as are customary in many forms of gearing, especially in spiral bevel gears. Moreover I may provide slight differences in the perpendicular pitch on the two members of a pair of worm gears or broadly of a pair of gears having angularly disposed axes, one purpose of such provision being to anticipate and to correct unequal distortions in the hardening process, when the two members of a gear pair are unequal.

For definition of the scope of the invention, I rely on the claims.

What I claim is:

1. The method of forming worm gears, which consists in providing a rotary tool having forming portions disposed in a surface of revolution, said surface being convex in its peripheral direction, in rotating said tool on its axis adjacent a worm gear blank, in effecting turning motion between said tool and said blank about the axis of said blank, and in effecting translatory feeding motion between said tool and said blank along a straight line disposed at an acute angle to the axis of said blank, in timed relation to said turning motion.

2. The method of forming worm gears, which consists in providing a rotary tool having forming portions disposed in a conical surface, in rotating said tool on its axis adjacent a worm gear blank, in turning said blank on its axis, and in effecting translatory feeding motion between said tool and said blank along a straight line disposed at an acute angle to the axis of said blank, in timed relation to said turning motion of the blank.

3. The method of forming gears, which consists in providing a rotary tool whose forming portions occupy a surface of revolution, said surface being convex in its peripheral direction, in mounting said tool and a gear blank on axes disposed at an acute angle to each other in rotating said tool on its axis in engagement with said gear blank, in effecting turning motion between said tool and said blank about the axis of said blank, and in effecting translatory feeding motion between said tool and said blank in the direction of the tool axis, in timed relation to said turning motion.

4. The method of forming gears, which consists in providing a cutter unit having cutting portions disposed in a plurality of coaxial rings of substantially equal diameters, in mounting said cutter unit and a gear blank on angularly disposed axes, in rotating said cutter unit on its axis in engagement with said gear blank, in effecting turning motion between said cutter unit and said blank about the axis of said blank, and in effecting translatory feeding motion between said cutter unit and said blank in the direction of the axis of said cutter unit, at a constant ratio to said turning motion.

5. The method of forming a gear of a pair of gears mounted on angularly disposed and offset axes, which consists in providing a grinding wheel having a conical grinding surface, in mounting said grinding wheel and a gear blank on offset axes disposed at an acute angle to each other, in rotating said grinding wheel in engagement with said blank, in turning said blank on its axis, and in effecting translatory motion between said grinding wheel and said blank in the direction of the axis of said grinding wheel, in timed relation to the turning motion of the blank.

6. The method of forming a worm gear, which consists in providing a pair of coaxial grinding wheels having conical grinding surfaces, in mounting said grinding wheels and a worm gear blank on angularly disposed axes so that said grinding wheels may pass simultaneously through different tooth spaces of said blank, in rotating said grinding wheels on their axis, in turning said blank on its axis, and in effecting translatory motion between said grinding wheels and said blank in the direction of the axis of the grinding wheels, in timed relation to said turning motion of the blank.

7. The method of forming a worm gear, which consists in providing a rotary tool having forming portions disposed in a conical surface, the profile inclination of said conical surface differing from the pressure angle with which said worm gear meshes with its mating worm gear at a mean point of mesh, in rotating said tool on its axis adjacent a worm gear blank, in turning said blank on its axis, and in effecting translatory feeding motion between said tool and said blank along a straight line disposed at an acute angle to the axis of said blank, in timed relation to said turning motion of the blank.

8. The method of successively grinding equal gears with a grinding wheel in motions comprising a turning motion of the gear blank and a translatory motion between said grinding wheel and said gear blank in timed relation to said turning motion, which consists in changing the angular position of the grinding wheel in correspondence with the reduction of its diameter.

9. The method of forming tooth surfaces on articles of gear form, which consists in providing a rotary tool whose forming portions occupy a surface of revolution, said surface of revolution being convex in its peripheral direction, in mounting said tool and an unfinished article on offset axes disposed at an acute angle to each other, in rotating said tool on its axis, and in providing timed motions between said tool and said article, said timed motions comprising a turning motion about the axis of said article and a translatory motion along a straight line disposed at an acute angle to the axis of said article, said line being so disposed that the tooth bottoms produced on said article are tangent to a cylindrical surface.

10. The method of forming tooth surfaces on articles of gear form, which consists in providing a rotary tool whose forming portions occupy a surface of revolution, said surface of revolution being convex in its peripheral direction, in mounting said tool and an unfinished article on offset axes disposed at an acute angle to each other, in rotating said tool on its axis, and in providing timed motions between said tool and said article, said timed motions comprising a turning motion about the axis of said article and a translatory motion along a straight line disposed at an acute angle to the axis of said article, said line being so disposed that the tooth bottoms produced on said article are tangent to a cylindrical surface and being substantially perpendicular to the direction of the engaged tooth.

ERNEST WILDHABER.